(12) United States Patent
Zandifar et al.

(10) Patent No.: US 12,044,789 B2
(45) Date of Patent: Jul. 23, 2024

(54) SYSTEMS AND METHODS FOR OCCUPANCY DETECTION USING WIFI SENSING TECHNOLOGIES

(71) Applicants: Azar Zandifar, Outremont (CA); Negar Ghourchian, Montreal (CA); Michel Allegue Martinez, Terrebonne (CA)

(72) Inventors: Azar Zandifar, Outremont (CA); Negar Ghourchian, Montreal (CA); Michel Allegue Martinez, Terrebonne (CA)

( * ) Notice: Subject to any disclaimer, the term of this patent is extended or adjusted under 35 U.S.C. 154(b) by 426 days.

(21) Appl. No.: 17/367,986

(22) Filed: Jul. 6, 2021

(65) Prior Publication Data

US 2021/0333351 A1   Oct. 28, 2021

Related U.S. Application Data

(63) Continuation-in-part of application No. 17/347,754, filed on Jun. 15, 2021, and a continuation-in-part of application No. 17/314,447, filed on May 7, 2021, now Pat. No. 11,774,542, and a continuation-in-part
(Continued)

(51) Int. Cl.
*G01S 5/02* (2010.01)
*H04B 17/21* (2015.01)
(Continued)

(52) U.S. Cl.
CPC ............. *G01S 5/021* (2013.01); *G01S 5/02* (2013.01); *G01S 5/0221* (2013.01); *H04B 17/21* (2015.01); *H04B 17/27* (2015.01); *H04W 64/00* (2013.01)

(58) Field of Classification Search
CPC .......... G01S 13/04; G01S 7/415; G01S 7/417; G01S 13/003; G01S 13/34; G01S 13/42; G01S 13/56; G01S 5/02; G01S 5/021; G01S 5/0221; G01S 7/006; G01S 7/41; B60R 21/01512; G06F 18/24; G06V 20/59; G06V 20/64; H04B 17/21; H04B 17/27; H04W 64/00; Y02D 30/70
See application file for complete search history.

(56) References Cited

U.S. PATENT DOCUMENTS 8,138,918 B2   3/2012   Habib et al.
8,818,288 B2   8/2014   Patwari et al.
(Continued)

FOREIGN PATENT DOCUMENTS

CN   103648106 B   3/2017
CN   105828289 B   9/2019

*Primary Examiner* — Timothy X Pham
(74) *Attorney, Agent, or Firm* — Rosenberg, Klein & Lee (57) ABSTRACT

Wireless device free "occupancy detection" in residential or small industrial properties is an essential function within the broader scope of smart environments. Applications include, monitoring a subject's, e.g. an elderly person, behaviour for health assessments or moving towards more efficient energy usage in smart homes. Changes and disruption of wireless signals transmitted and received by the plurality of wireless devices are collected and analyzed to infer the presence of a subject the sensing area. More particularly, CSI information over time analysed with one or models can estimate the presence of a subject within the sensing area whether the subject moves or stays still.

17 Claims, 6 Drawing Sheets

Related U.S. Application Data of application No. 17/199,952, filed on Mar. 12, 2021, now Pat. No. 11,348,428, and a continuation-in-part of application No. 17/019,759, filed on Sep. 14, 2020, now Pat. No. 11,212,650, and a continuation-in-part of application No. 16/922,251, filed on Jul. 7, 2020, now Pat. No. 11,150,320, said application No. 17/019,759 is a continuation of application No. 16/461,492, filed as application No. PCT/CA2017/000247 on Nov. 21, 2017, now Pat. No. 10,779,127, said application No. 17/347,754 is a continuation of application No. 16/303,301, filed as application No. PCT/CA2017/000136 on May 31, 2017, now Pat. No. 11,043,094, said application No. 16/922,251 is a continuation of application No. 15/493,616, filed on Apr. 21, 2017, now Pat. No. 10,705,179.

(60) Provisional application No. 63/048,300, filed on Jul. 6, 2020, provisional application No. 63/021,255, filed on May 7, 2020, provisional application No. 62/988,846, filed on Mar. 12, 2020, provisional application No. 62/425,267, filed on Nov. 22, 2016, provisional application No. 62/347,217, filed on Jun. 8, 2016, provisional application No. 62/326,231, filed on Apr. 22, 2016.

(51) Int. Cl.
*H04B 17/27* (2015.01)
*H04W 64/00* (2009.01)

(56) References Cited

U.S. PATENT DOCUMENTS

| | | |
|---|---|---|
| 8,836,344 B2 | 9/2014 | Habib et al. |
| 9,143,968 B1 | 9/2015 | Manku et al. |
| 9,208,676 B2 | 12/2015 | Fadell et al. |
| 9,520,041 B2 | 12/2016 | Rosa et al. |
| 9,659,474 B1 | 5/2017 | Kashyap et al. |
| 10,008,107 B2 | 6/2018 | Li |
| 10,104,195 B2 | 10/2018 | Chen et al. |
| 2003/0052821 A1 | 3/2003 | Holt |
| 2004/0021599 A1 | 2/2004 | Hall et al. |
| 2005/0227707 A1 | 10/2005 | Law et al. |
| 2006/0092016 A1 | 5/2006 | Modes et al. |
| 2008/0191941 A1 | 8/2008 | Saban et al. |
| 2008/0204322 A1 | 8/2008 | Oswald et al. |
| 2010/0109842 A1 | 5/2010 | Patel et al. |
| 2010/0130229 A1 | 5/2010 | Sridhara et al. |
| 2010/0231449 A1 | 9/2010 | Jacobs |
| 2011/0273321 A1 | 11/2011 | Joshi et al. |
| 2012/0122484 A1 | 5/2012 | Marchenko et al. |
| 2012/0146788 A1 | 6/2012 | Wilson et al. |
| 2012/0164978 A1 | 6/2012 | Conti et al. |
| 2013/0346014 A1 | 12/2013 | Nadkarni et al. |
| 2014/0004874 A1* | 1/2014 | Schwartz ............... G01S 1/08 455/456.1 |
| 2014/0285660 A1 | 9/2014 | Jamtgaard et al. |
| 2015/0005030 A1 | 1/2015 | Pennanen et al. |
| 2015/0324412 A1 | 11/2015 | Pennanen et al. |
| 2016/0178741 A1 | 6/2016 | Ludlow et al. |
| 2016/0183059 A1 | 6/2016 | Nagy et al. |
| 2016/0309834 A1 | 10/2016 | Zwick et al. |
| 2016/0345286 A1 | 11/2016 | Jamieson et al. |
| 2017/0212210 A1 | 7/2017 | Chen et al. |
| 2017/0223498 A1* | 8/2017 | Banavar ............... H04W 4/021 |
| 2017/0244597 A1 | 8/2017 | Coote |
| 2017/0309146 A1* | 10/2017 | Mackenzie ........ G08B 13/2491 |
| 2018/0106897 A1 | 4/2018 | Shouldice et al. |
| 2018/0294904 A1 | 10/2018 | Allegue Martinez et al. |
| 2018/0365975 A1* | 12/2018 | Xu ....................... H04B 7/0626 |

* cited by examiner

SYSTEMS AND METHODS FOR OCCUPANCY DETECTION USING WIFI SENSING TECHNOLOGIES

CROSS-REFERENCE TO RELATED APPLICATIONS

This application claims the benefit of priority from U.S. Provisional Patent Application 63/048,300 filed Jul. 6, 2020 entitled "Systems and Methods for Occupancy Detection using WiFi Sensing Technologies" the entire contents of which are incorporated herein by reference.

This application claims the benefit of priority as a continuation-in-part from U.S. patent application Ser. No. 17/314,447 filed May 7, 2021; which itself claims the benefit of priority from U.S. Provisional Patent Application 63/021,255 filed May 7, 2020, the entire contents of each being incorporated herein by reference.

This application claims the benefit of priority as a continuation-in-part from U.S. patent application Ser. No. 16/922,251 filed Jul. 7, 2020; which itself claims the benefit of priority from U.S. patent application Ser. No. 15/493,616 filed Apr. 21, 2017 which has issued as U.S. Pat. No. 10,705,179; which itself claims the benefit of priority from U.S. Provisional Patent Application 62/326,231 filed Apr. 22, 2016, the entire content of each being incorporated herein by reference.

This application claims the benefit of priority as a continuation-in-part from U.S. patent application Ser. No. 17/019,759 filed Sep. 14, 2020; which itself claims the benefit of priority from U.S. patent application Ser. No. 16/461,492 filed May 16, 2019 which has issued as U.S. Pat. No. 10,779,127; which itself claims the benefit of priority from PCT/CA2017/000,247 filed Nov. 21, 2017; which itself claims the benefit of priority from U.S. Provisional Patent Application 62/425,267 filed Nov. 22, 2016, the entire contents of each being incorporated herein by reference.

This application claims the benefit of priority as a continuation-in-part from U.S. patent application Ser. No. 17/347,754 filed Jun. 15, 2021; which itself claims the benefit of priority from U.S. patent application Ser. No. 16/303,301 filed Nov. 20, 2018 which has issued as U.S. Pat. No. 11,043,094; which itself claims the benefit of priority from PCT/CA2017/000,136 filed May 31, 2017; which itself claims the benefit of priority to U.S. Provisional Patent Application 62/347,217 filed Jun. 8, 2016, the entire contents of each being incorporated herein by reference.

This application claims the benefit of priority as a continuation-in-part from U.S. application Ser. No. 17/199,952 filed Mar. 12, 2021; which itself claims the benefit of priority from U.S. Provisional Patent Application 62/988,846 filed Mar. 12, 2020, the entire contents of each being incorporated herein by reference.

FIELD OF THE INVENTION

This invention relates to system and methods of using wireless signals to create an active sensing area and characterizing the disturbance of wireless signals to detect and track the occupancy status of the sensing area such as residentials or industrial indoor environments.

BACKGROUND OF THE INVENTION

Many currently used wireless communication systems such as LTE, LTE-Advance, IEEE 802.11n, IEEE 802.11ac (WiFi 5), and IEEE 802.11ax (WiFi 6) continuously sense the state of the wireless channel through well-known signals, or pilot signals, in order to dynamically optimize the transmission rate or improve the robustness of the system. These channel sensing mechanisms are continuously improving and enable self-driven calibration systems and wireless signal pre-compensation and post-compensation techniques, significantly improving the quality of wireless communication.

More fine-grained information is available in modern communication systems and several approaches have been proposed in order to improve these systems. For example, a method that provides periodic channel state information (CSI) data has been developed. However, these fine-grained measurements are not only valuable for controlling and optimizing communication networks and links as they can also be used for the purpose of detecting motion or human activities within a sensing area.

Several signals are broadcasted or emitted in type of frames by the stations (STA) and Access Points (APs) in WiFi networks even without requiring association between them. For example, before two devices can associate to each other, each of them can read frames from the environment and each of them can decide to broadcast or send one or multiple frames or wireless signals in general.

Occupancy (presence) detection using the existing wireless infrastructure and the abundant commodity WiFi devices, can be considered as an attractive area of interest for many industries. In this invention, a CSI-based passive occupancy detection solution is presented that leverages the existing wireless infrastructure to sense presence or absence of a target. The solution studies the changes in WiFi signals, represented by channel state information (CSI) through time, due to human body presence and motion in the observed environment This invention relates to system and methods of using wireless signals to create a sensing infrastructure for tracking the occupancy status within a sensing residentials or industrial indoor environments. Occupancy refers to a state when a subject is present in sensing area. The subject may be moving, standing still, sitting or sleeping or doing any kind of activity within the sensing area.

Wireless device free "Occupancy detection" in residential or small industrial properties is an essential function within the broader scope of smart environments. Among many applications, this innovation can be used for monitoring subject's—e.g. an elderly person—behaviour for health assessments, or to move toward more efficient energy usage in smart homes.

Tracking occupancy in a living area, provides tools to assess a subject's behavioural analysis such as activity pattern, and time spent outside. Recent studies suggest that chronic sedentary behavior is associated with increased risk of at least 35 chronic diseases. Moreover, spending time outdoor is associated with better physical and mental health in older adults. Therefore, activity monitoring when at home, and time spent outdoor is crucial in elder care to predict and prevent anomalies.

The changes and disruption of wireless signals transmitted and received by the plurality of wireless devices are collected and analyzed to infer the presence of a subject the sensing area. More particularly, using CSI information through time a method is proposed that models and estimates the presence of a subject within the sensing area whether the subject moves or stays still.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to using wireless signals to create an active sensing area and characterizing the disturbance of wireless signals to detect and track the occupancy status of the sensing area such as residentials or industrial indoor environments.

In accordance with an embodiment of the invention there is provided a system comprising:
a plurality of wireless devices, each wireless device associated with a predetermined indoor region of a property and operating according to a common wireless standard; and
a device comprising at least a processor and a memory for storing computer executable instructions which when executed by the processor configure the device to:
receive and store a plurality of metrics extracted from wireless signals transmitted and received by the plurality of wireless enabled devices;
process the extracted plurality of metrics; and
establish an occupancy of the predetermined indoor region of the property.

In accordance with an embodiment of the invention there is provided a system comprising:
a device comprising at least a processor and a memory for storing computer executable instructions which when executed by the processor configure the device to:
receive and store a plurality of metrics extracted from wireless signals transmitted and received by a plurality of wireless enabled devices;
process the extracted plurality of metrics; and
establish an occupancy of the predetermined indoor region of the property; wherein
the plurality of wireless devices are associated with a predetermined indoor region of a property and operate according to a common wireless standard.

BRIEF DESCRIPTION OF THE DRAWINGS

Embodiments of the present invention will now be described, by way of example only, with reference to the attached Figures, wherein.

DETAILED DESCRIPTION

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "subject" as used herein may refer to, but is not limited to, an individual or group of individuals. This includes, but is not limited to, private individuals, employees of organizations and/or enterprises, an unknown individual or an intruder, members of community organizations, members of charity organizations, men, women, and children. In its broadest sense the user may further include, but not be limited to, software systems, mechanical systems, robotic systems, android systems, etc. that may be characterized, i.e. identified, by one or more embodiments of the invention.

A "transmitter" (a common abbreviation for a radio transmitter or wireless transmitter) as used herein may refer to, but is not limited to, an electronic device which, with the aid of an antenna, produces radio waves. The transmitter itself generates a radio frequency alternating current containing the information to be transmitted which is applied to the antenna which radiates radio waves. A transmitter may be discrete, or it may form part of a transceiver in combination with a receiver. Transmitters may be employed within a variety of electronic devices that communicate by wireless signals including, but not limited to, PEDs, FEDs, two-way radios, and wireless beacons. A transmitter may operate according to one or more wireless protocols in dependence upon its design.

A "receiver" (a common abbreviation for a radio receiver or wireless receiver) as used herein may refer to, but is not limited to, an electronic device that receives radio waves via an antenna which converts them to a radio frequency alternating current wherein the receiver processes these signals to extract the transmitted information. Receivers may be employed within a variety of electronic devices that communicate by wireless signals including, but not limited to, PEDs, FEDs, two-way radios, and wireless beacons. A receiver may operate according to one or more wireless protocols in dependence upon its design.

A "wireless transceiver" as used herein may refer to, but is not limited to, a transmitter and a receiver comprising components needed for sending and receiving wireless signals, e.g. antenna, amplifiers, filters, mixers, local oscillators, ADC and DAC, and any other component required in the modulator and demodulator.

"Device-free technology" as used herein may refer to, but is not limited to, a system for detecting and/or identifying target user(s) or the subject(s) which does not require to wear any device with him/her/them in order for the system or the technology to know that there is human motion in the sensing area or to detect the type of activities or not that the subject(s) are performing.

"Device-oriented technology" as used herein may refer to, but is not limited to, a system for detecting and/or identifying target user(s) or the subject(s) which assumes, but not necessarily, that the subject(s) are wearing a device but irrespective of these assumptions tracks the device rather the individual.

A "wireless protocol" as used herein may refer to, but is not limited to, a specification defining the characteristics of a wireless network comprising transmitters and receivers such that the receivers can receive and convert the information transmitted by the transmitters. Such specifications may therefore define parameters relating to the wireless network, transmitters, and receivers including, but not limited to, frequency range, channel allocations, transmit power ranges, modulation format, error coding, etc. Such wireless protocols may include those agreed as national and/or international standards within those regions of the wireless spectrum that are licensed/regulated as well as those that are unlicensed such as the Industrial, Scientific, and Medical (ISM) radio bands and hence are met by equipment designed by a single original equipment manufacturer (OEM) or an OEM consortium. Such wireless protocols may include, but are not limited to, IEEE 802.11 Wireless LAN and any of their amendments, IEEE 802.16 WiMAX, GSM (Global System for Mobile Communications, IEEE 802.15 Wireless PAN, UMTS (Universal Mobile Telecommunication System), EV-DO (Evolution-Data Optimized), CDMA 2000, GPRS (General Packet Radio Service), EDGE (Enhanced Data Rates for GSM Evolution), Open Air, HomeRF, HiperLAN1/HiperLAN2, Bluetooth, ZigBee, Wireless USB, 6IoWPAN, and UWB (ultra-wideband).

The motivation is to utilize only off-the-shelf devices such as access points (APs), laptops, or any devices equipped with a network interface card (NIC) that are ubiquitous in modern households and monitor the signal patterns between nodes of communication.

This invention relates to a method for building an initial "Occupancy detection" model that includes receiving and analyzing wireless signals, while a user is present (e.g., standing, sitting, sleeping, walking or doing any kind of activity), and empty situation from variety of sensing environments. The method includes an AI-based occupancy detection method, which exploits sequential information from a device-free motion detection module followed by various signal processing, data mining, machine learning (including but not limited to deep learning, supervised and unsupervised learning) and feature extraction techniques to statistically formulate the correlation between wireless signal readings and occupancy status of the sensing environment.

The method can also make use of other auxiliary information such as, but not limited to, the time of the day, to enhance the final decision.

A model for prompt evaluation of occupancy status which receives a live stream of wireless signal from past and present to estimate the current occupancy status of the sensing area.

A post-hoc correction method which uses a probabilistic representation of a sensing area status changes to be served as a priori information to calibrate the output of the main presence detection module.

A provisional method to re-calibrate the system in case of performance deterioration due to specific environment characterization. The data collected while calibration can be used to augment the pre-recorded data, and then to improve the pre-trained probabilistic model.

Figure 1:
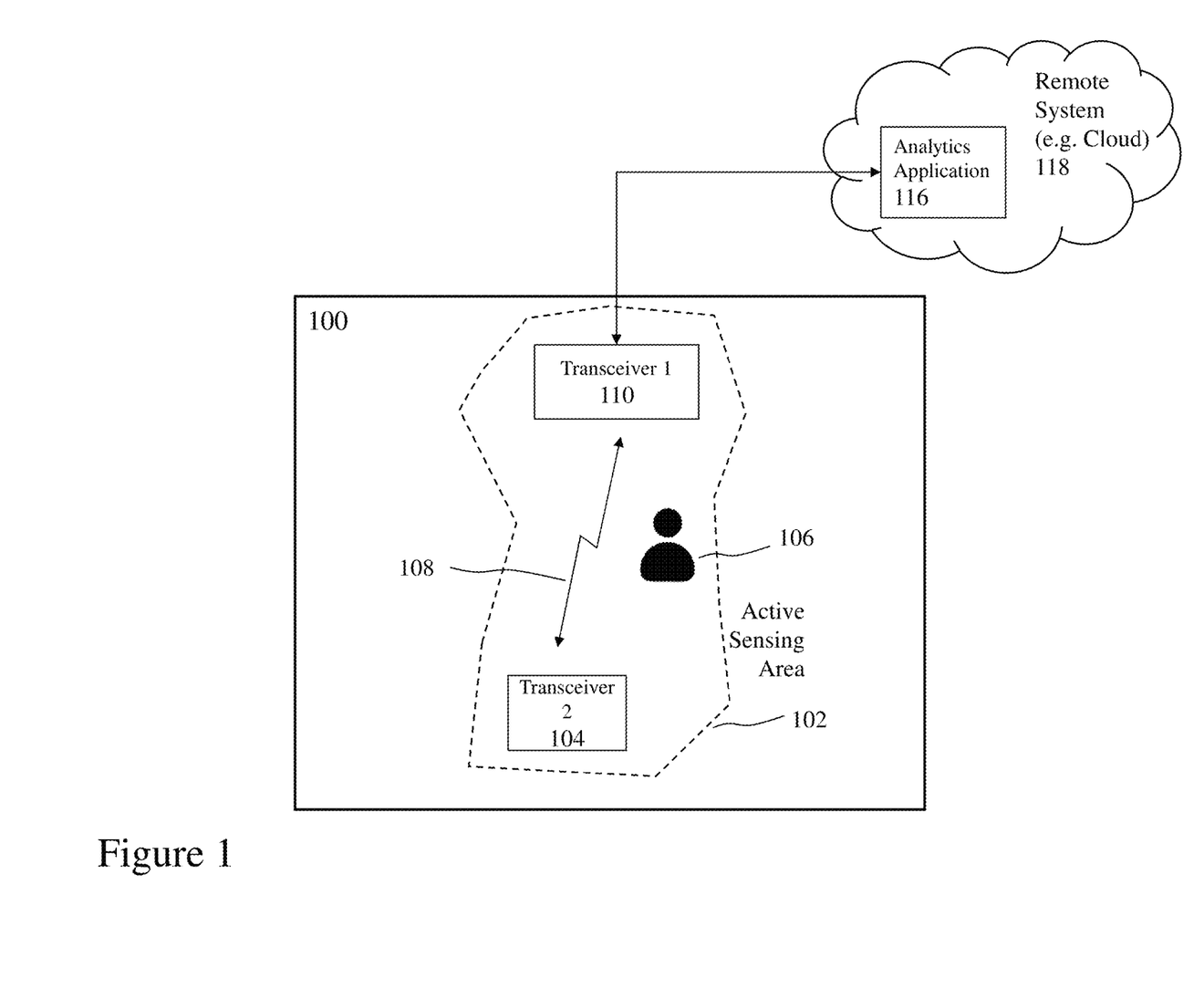
FIG. 1 depicts a system able to sense subject(s) within a sensing area via wireless signals and potential devices that the subject or subjects are carrying on, and/or wearing.

A wireless device-free motion detection system is illustrated in FIG. 1. The wireless device-free motion detection system is comprised of at least two transceivers 110 and 104. The transceivers 110 and 104 are associated through any of the standards, e.g. WiFi. Device-free motion detection is proven to be possible by looking at the appropriate metrics and/or measurements performed by any of the transceivers because moving objects distort the wireless signals exchanged between transceivers. Then, an area, referred to as the active sensing area 102, is created between the devices, which is sensitive to (human and/or pet, and or other moving objects) motion. Active sensing area 102 is within the perimeters of area 100, which could be any residential or commercial space and could include both indoor and outdoor spaces. The system proposed here should contain at least one active sensing area 102. Integration of multiple sensing areas as well as single active sensing area is considered part of the system proposed herein. The wireless device-free motion detection system can compute the motion detection either locally in the premise or local area network LAN, in any of the devices of the network, and/or in a cloud-based computing resource(s) 118 as in FIG. 1.

The system can collect, through at least one of the devices in the network where the transceivers 110 and 104 are connected, a wide range of information from all or any of the devices (e.g. transceivers 110 and 104) within the area 100. As an example, this information includes but is not limited to Physical Layer (PHY layer), Media Access Control (MAC) sublayer and Logical Link Control (LLC) sublayer which are the two sublayers of the Data Link (DL) Layer of the OSI model. The PHY layer and the DL layer contain information about the frequency response of the channel, and/or phase response of the channel, and/or impulse response of the channel, and/or received signal strength indicators (RSSI), and/or the media access control address (MAC address), and/or capture of probe requests, capture of any broadcasting frame before the association between devices, control frames after or before association between devices, any frame related to the association process, and/or any other statistic that describes the wireless communication link between paired devices.

The system in FIG. 1 exploits and quantify the physical motion occurred in the sensing area by analyzing the changes and disruption of the wireless measurements collected from the devices, e.g. transceivers 110 and/or 104.

In FIG. 1, devices 112 and 114 are also transceivers.

Figure 2:
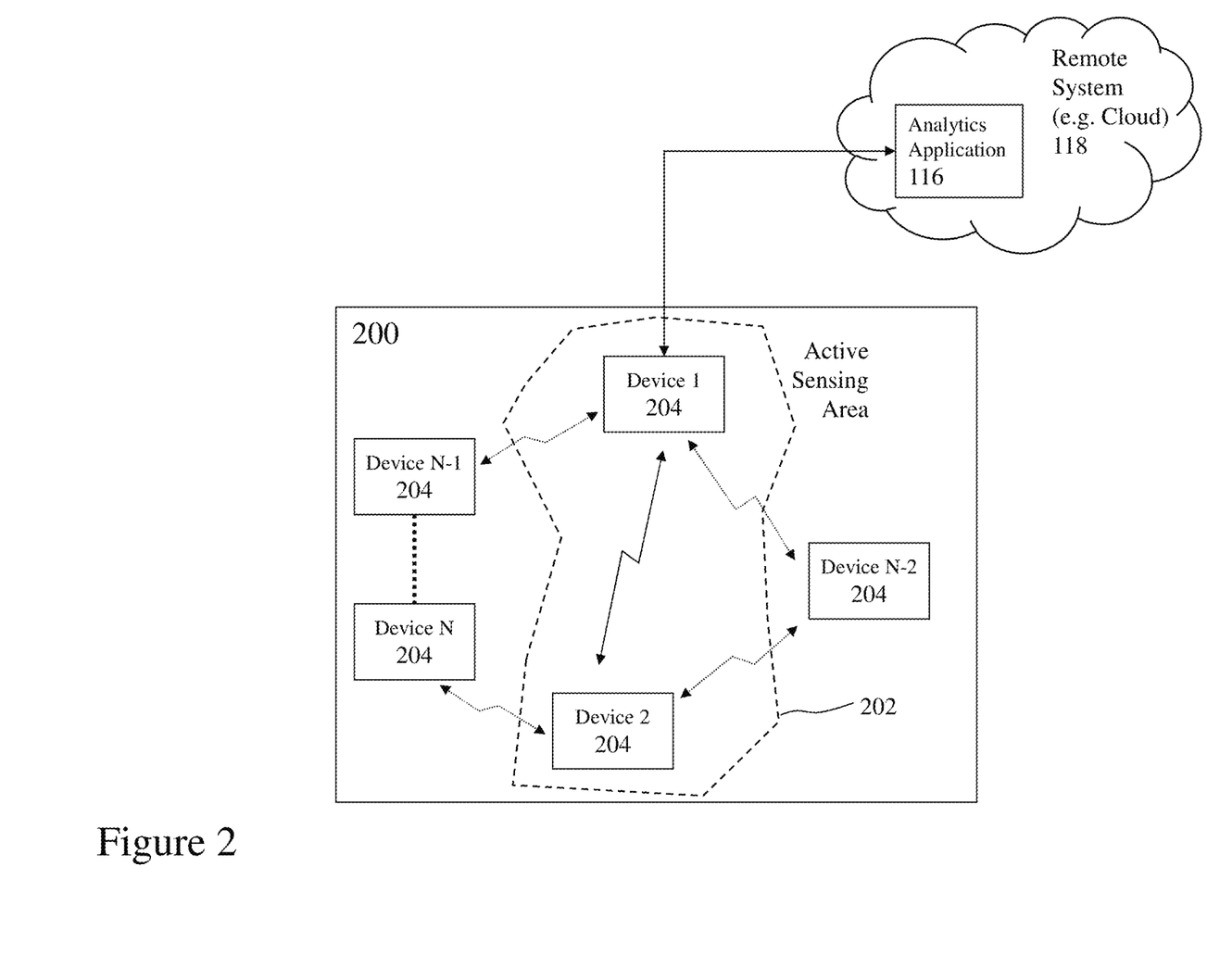
FIG. 2 depicts a system able to sense subject(s) within an area via wireless signals by connecting at least two instances of the transceivers and/or plurality of devices.

FIG. 2 is an example and a more general network configuration that could exist. In one of the embodiments described herein, a communication network 200 comprises at least two devices 204 as shown in FIG. 2. In this embodiment, devices 204 comprise the entire communication network. The devices 204 can act as a transceiver 110 and/or 104. By employing two instances of device 204, referred to as Device 1 and Device 2, a sensing area 202 is created as illustrated in FIG. 2. If part or all of the analytics application 118 is hosted in a remote facility, at least one of Device 1 or Device 2 needs to be capable of connecting to the remote network where the application 116 is hosted. If additional devices 204 are incorporated into the sensing system, the active sensing area 202 is enhanced and/or extended according to the number and location of new devices available within the communication network 200 and their wireless communication range. Enhancement of the sensing area occurs as a result of the increase in the number of data sources available. Extension of the sensing area occurs as a result of the increase in overall reach of the wireless network 200. The scope of the systems and methods proposed herein are not limited by any network topology. The communication network 200 could be created by following any of the regulated communication standards, e.g. IEEE 802.11 standard family or some new standard.

Figure 3:
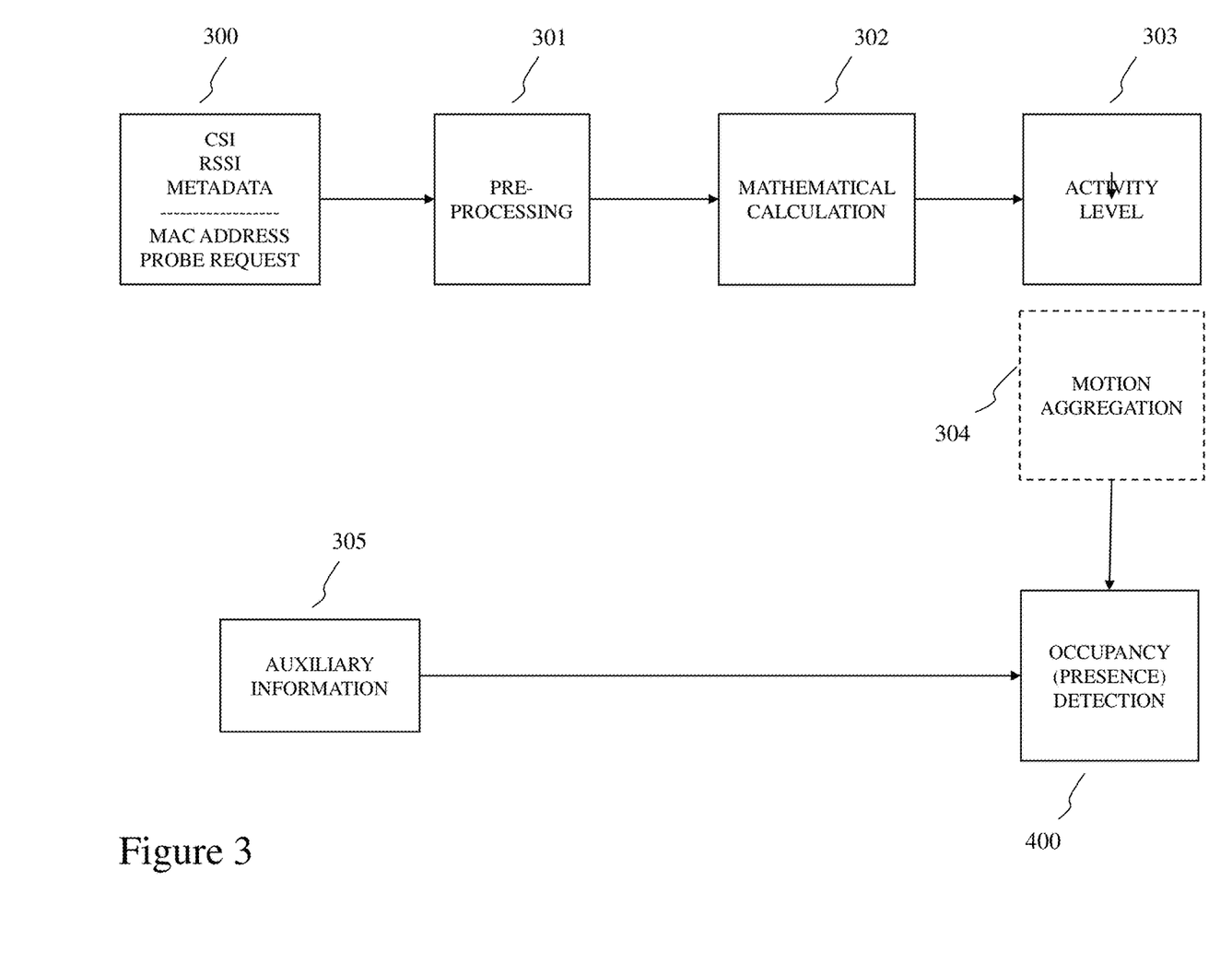
FIG. 3 depicts an exemplary architecture of a system for motion quantization from the Wi-Fi measurements according to an embodiment of the invention.

FIG. 3 is an illustration of the workflow of presence sensing system and method. The method proposed herein analyses the wireless channel response between connected devices in multiple frequencies and spatial streams in MIMO channels. This is referred to as raw data or wireless channel measurements 300, in FIG. 3. Referring to FIG. 3, the data packets received from 300 are passed through a series of pre-processing steps 301 and then they are passed through a series of mathematical function 302, including but not limited to digital signal processing (DSP) and statistical filters, to clean noise and remove anomalous packets. These cleaned packets from 302 are then fed to activity level calculation unit 303, for the estimation of a numerical value that quantifies the intensity of motion that the presence of a subject has caused in the sensing area mentioned herein as the activity level (303). Therefore, the disturbances are expected to be minimized in case the sensing area is empty. Specific details provided here is an explanatory model of a motion quantization module as input to the presence detection system.

The quantized motion can be either driven from a single set of receiver and transmitter or from a plurality of devices. The final quantized motion can then be fed separately to the presence detection module or through an aggregation step (FIG. 3, 304). The aim of the aggregation step is to have a single motion representation, which includes the information from all the sources. Using first principal component of the principal component analyses (PCA) of the aggregated sources can be considered as an example for such a module. PCA-based aggregation is just described here as an example, the choice of aggregation models for this module, however, can go beyond that.

Referring to FIG. 3, occupancy (presence) detection 400 can be considered as a complementary process, which uses quantized motion as input and outputs prediction about occupancy status of the sensing environment. However, it is understood that the procedure may be practiced without these specific details.

The presence detection module 400 can use other sources of information like time of the day to infer the occupancy state of the sensing area. In this document, these types of information are called auxiliary information. Referring to FIG. 3, auxiliary information 305 refers to pieces of information that are extracted from sources other than quantified Wi-Fi-based motion. This information may include (but is not limited to) time-based information (such as hour, day, week and month), visual or auditory information collected from camera and/or microphones, and non-Wi-Fi based ambient sensory information (such as temperature and ambient light), collected from the sensing area (industry, household).

Figure 4:
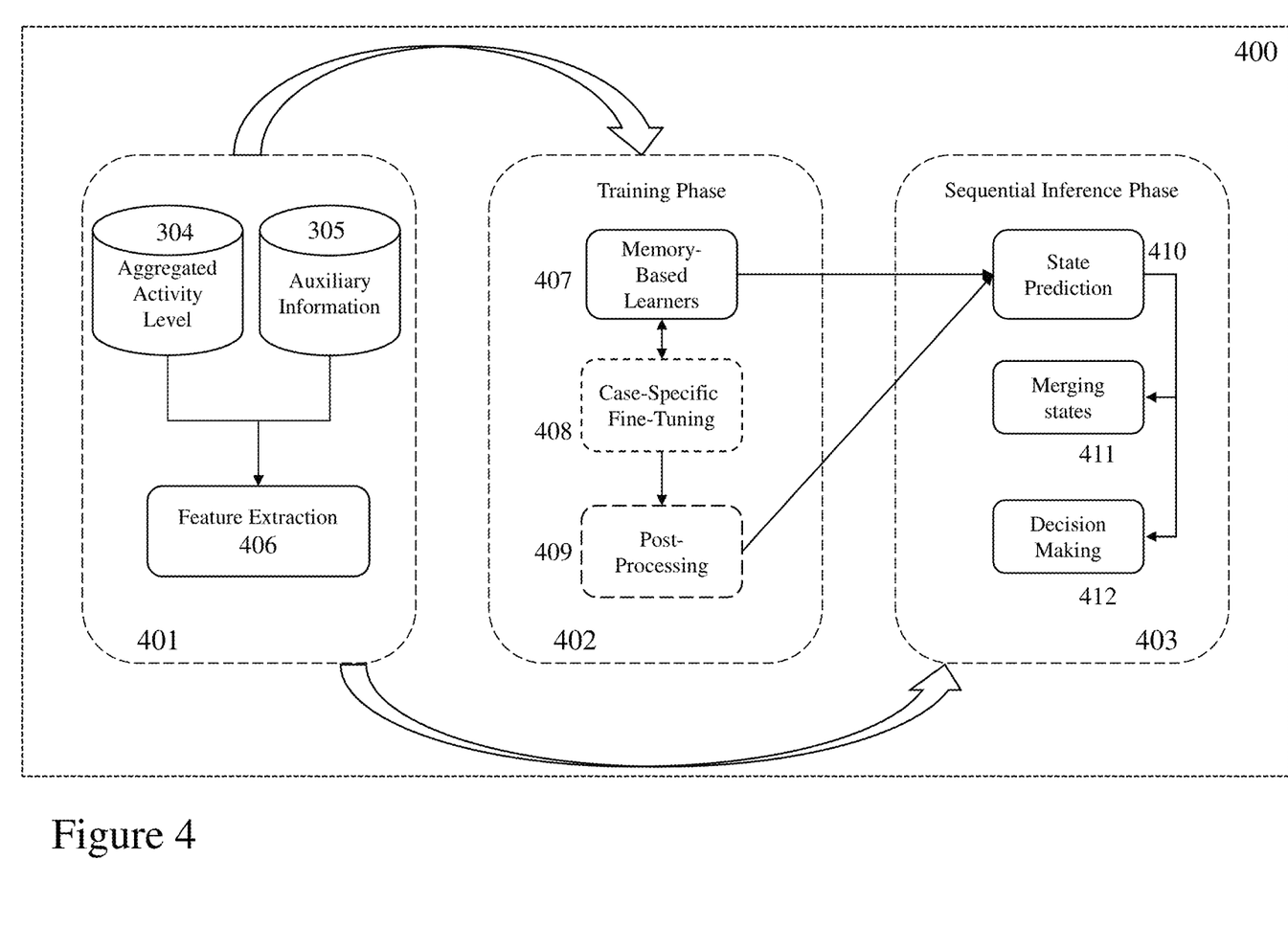
FIG. 4 depicts an exemplary architecture of the proposed occupancy detection system.

FIG. 4 illustrate flow diagram of the AI-based presence detection module 400 proposed herein to detect presence status through activity level and auxiliary information.

The presence detection module 400 contains several procedures and processes including, but not limited to, feature extraction module 401, a training and inference module 402, and a decision-making unit 403.

Referring to FIG. 4, module 401 extracts information from motion level (304), which enables the presence detection module to process the information using higher order statistics exploiting information using different statistical representations. These features include but are not limited to first- and second-degree statistics (mean, standard deviation, median absolute deviation (MAD), coefficient of variation, etc.) of a time interval over the activity levels. The features are then combined with auxiliary information (305).

Features from module 401 will then be fed to training and inference module (402), wherein an example method for occupancy detection problem is use of memory-based machine learning models or learners (407). An example method that can be used as a memory-based learner is Long Short-Term Memory (LSTM) architecture that is a sequential deep learning method, which can exploit historical dependence information. The data is provided to the unit in a sequence of time extracted features, this method of decision making is hereafter referred to as "sequence-to-sequence" inference such as the model exhibited in FIG. 5. Although here the details are described using LSTM as an example learner, it is known that other structures for sequential learning (such as attention-based models (e.g. Transforms), other Recurrent Neural Networks (RNN) subtypes (such as Gated Recurrent Units (GRUs)), as well as non-sequential Deep Learning models (such as Convolutional Neural Nets (CNNs), and other neural networks, tree-based and conventional machine learning structures), or a mixture of both sequential and non-sequential learner (such as LSTM-Conditional Random Field (CRF)) can as well be used to approach the problem.

In the training phase, data from variety of settings is used to train the model. The data is labeled manually to identify three states: subject moving, subject presence-not-moving (i.e. subject being present in the sensing area but not moving), and empty states. The labels are given as a state variable which shows the occupancy state of the sensing area at fixed or variable time intervals for example every 5 minutes (the identified state can be one of the states described above). The temporal resolution of labelling can be changed in different settings. Moreover, other unsupervised (or semi-supervised methods) can be used to mitigate the need of large labeled training datasets. These unsupervised methods include but are not limited to Variational Auto-Encoders (VAEs), Generative Adversarial Networks (GANs), etc. which learn a rich, latent representation of the training data that can then be used for downstream tasks, such as presence detection.

The training step is done offline with training data coming from a variety of settings. The model is trained using backpropagation through time.

In this scenario, no data augmentation method is used, but the training dataset can be enhanced with many data augmentation techniques (including but not limited to mix-up) which can be applied to improve the abundance of the training data or modelling the uncertainty in the labelling process.

The "occupancy detection" model can be enhanced using data from each setting. Data from different environment can be added to the training data to enhance the output for each setting. The model can be further enhanced for each problematic setting enhancing the training set using data from that specific setting to help further enhancing the model for that setting. In practice, the model can learn the specification of each environment, and get adjusted accordingly. This step is called fine tuning (408).

The post-processing step (409) can be done using some hard-coded rules like thresholding which may use information from auxiliary sources like hour of the day, or user input. However, in this example the focus is on a learning-based approach specifically designed for each category of environments. It should be mentioned that the approach described here is just an example of a learning-based approach, which can be changed and/or improved with other approaches without disrupting the idea behind the invention. As an example, for learning-based approaches, a state machine representation trained based on the training set is applied to further restrict improbable state changes. The post-processing step can be modified based on auxiliary information such as hour, etc., or based on data gathered from a user-specific setting through time. In this example, the final probabilities of state changes are further multiplied by state machine probabilities to minimize the probability of a state change which is rarely seen in the training data.

The final step gathers the information from the main learner and post-processing unit and combine the outputs to make the final desired output (410). The output of the model is the state of the environment which is either occupied or empty. The final step merges two separate states of occupancy (subject moving OR subject present-not-moving) to one single state, here after known as "occupied", while the state empty is preserved as "empty". That is, the final label is either "empty or "occupied" (FIG. 4 (411,412)).

Figure 5:
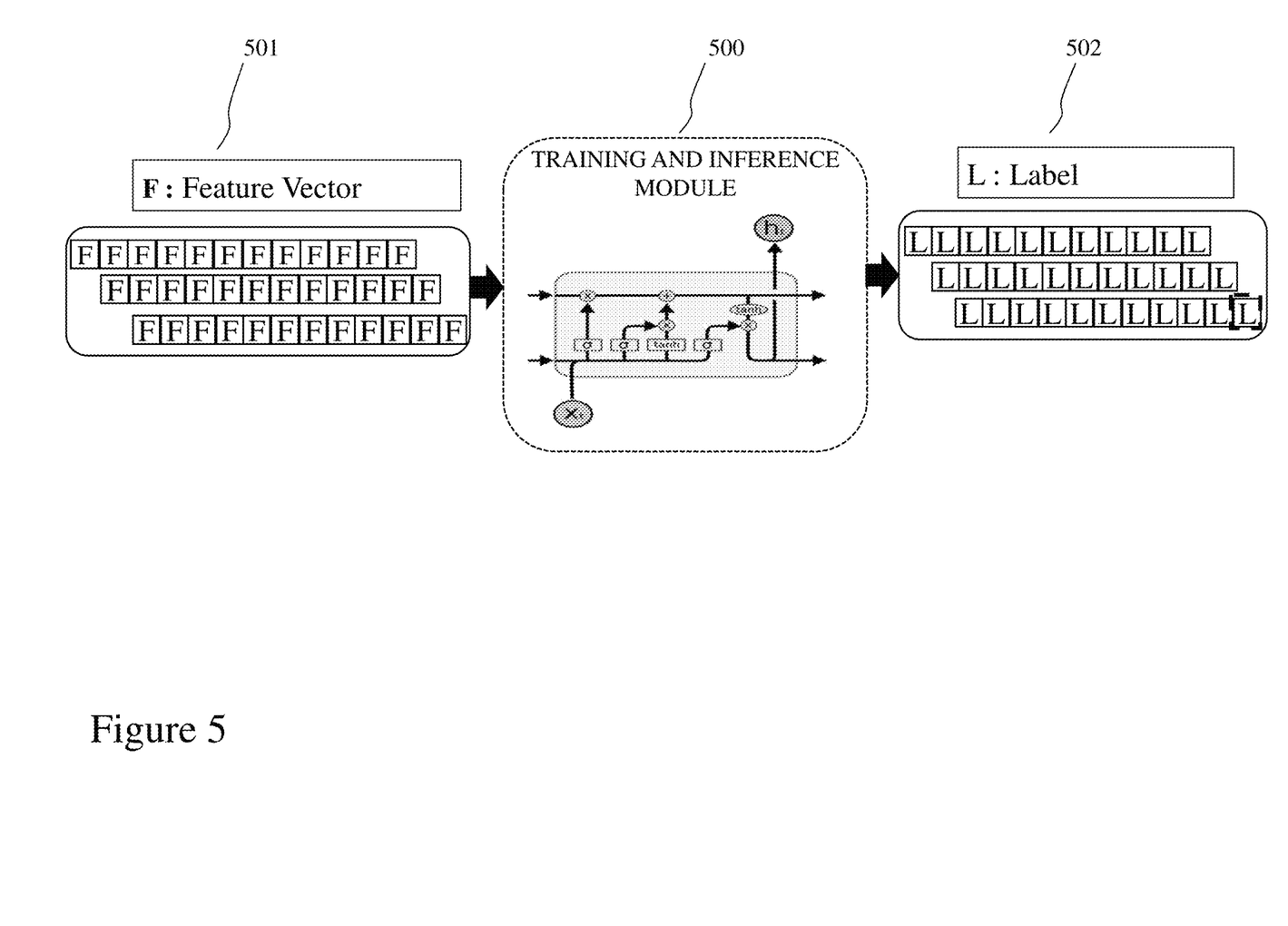
FIG. 5 illustrates input and output sequence to an exemplary sequence-based learning module.

In FIG. 5, a detailed version of an example sequence-based learner (500) is shown. "History" in this document refers to features extracted from the previous time points in streaming activity level. History window or "window" here is referred to the array of time-driven feature vector 501, which are combined to be fed to the decision maker module. This means that to assign a label (or sequence of labels) 502, to a given time point, information from previous states of the environment is being considered. It is worth mentioning that although this strategy is used as an example for using the long-term information of the data, this may as well include other ways of incorporating long time dependencies, including but not limited to extracting feature from a longer period.

Using a sliding window, a new decision is made at every fixed time-interval, for example every 5 minutes, based on the information from an hour before as history. It is worth mentioning that the window size for assigning a decision label can be shorter or longer without losing the general concept of the invention. The same logic applies to the length of the history window used. In fact, the length of each window can be chosen by the use-case implications. Using a sliding window to feed the learner, provides the ability to use information from longer period of history (total length of the history window) while assigning a label in a shorter period (label is assigned to each sub-window. This ability provides labeling in a finer granularity (which is desired in some use-cases), while preserving the ability to use historical information.

To summarize, the LSTM learner is fed with a sequence of data and will return a sequence of probabilities for each time step in the history. The output of the model can be fed directly to a SoftMax for decision making or can be sent out for further post-processing to a post-processing unit (409). In this example, a post-processing unit is included, characterized for domestic use cases. This unit can be optimized to be accustomed to any other setting (such as industrial, recreational, etc.).

Performance evaluation: The performance evaluation of the system is done using a dataset of multiple homes. The performance evaluation is done using one-environment-out strategy. Here One-environment-out strategy represents a performance evaluation approach in which the labelled data is gathered from diverse settings (different apartment, company offices, etc.), then to train the model all the available except one setting is used. That untouched setting is then used to evaluate the model. In fact, the model is evaluated based on a completely unseen environment. This strategy is taken to evaluate the performance of a system in the most adverse situation.

Figure 6:
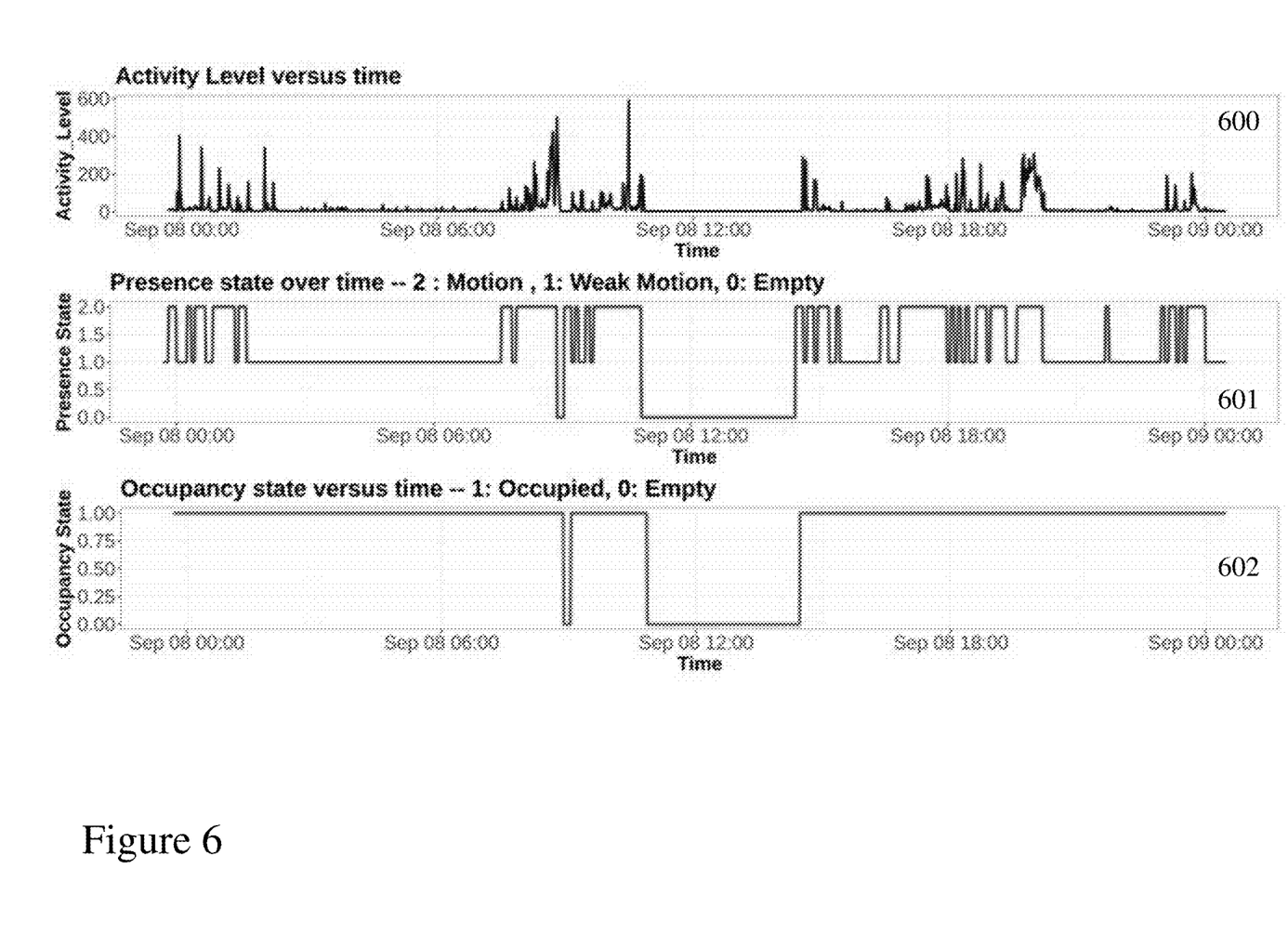
FIG. 6 depicts an exemplary performance evaluation for the occupancy (presence) detection module using quantized motion as input.

FIG. 6 illustrates the results of the proposed method that the accuracy of these learner is very high considering the extent of coverage of the sensing area in most of the settings.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, non-volatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alpha-numeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system comprising:
a device connected to a network comprising at least a processor and a memory for storing computer executable instructions which when executed by the processor configure the device to:
retrieve from another memory accessible to the processor a plurality of metrics extracted from a plurality of packets wirelessly transmitted and received by a wireless transmitter and a wireless receiver operating according to a common wireless standard associated with a sensing region forming part of an indoor region of a property;
process the extracted plurality of metrics for the plurality of packets to reduce noise and remove anomalous packets to generate cleaned packets;
process the cleaned packets to establish an estimate of numerical value quantifying the intensity of motion within the sensing region (quantized motion); and
process the quantized motion to establish an occupancy state of the sensing region.

2. The system according to claim 1, wherein
the wireless transmitter is associated with a wireless enabled device of a plurality of wireless enabled devices associated with the sensing region;
the wireless receiver is associated with another wireless enable device of the plurality of wireless enabled devices associated with the sensing region; and
processing the quantized motion to establish an occupancy state of the sensing region comprises performing an aggregation step to establish a single motion representation of motion within the sensing region where the aggregation step employs a set of quantized motions where each quantized motion of the set of quantized motions is established for a link between a pair of wireless enabled devices of the plurality of wireless enabled devices.

3. The system according to claim 1, wherein
the plurality of metrics extracted comprise two or more of:
channel state information of a first wireless channel of a plurality of wireless channels of a wireless link between the wireless transmitter and a wireless receiver;
a frequency response of a second wireless channel of the plurality of wireless channels of the wireless link;
a phase response of a third wireless channel of the plurality of wireless channels of the wireless link;
an impulse response of a fourth wireless channel of the plurality of wireless channels of the wireless link; and
one or more interface metrics extracted from one or more network interface cards associated with the system.

4. The system according to claim 1, wherein
the plurality of metrics extracted comprise at least one of:
a frequency response of a second wireless channel of the plurality of wireless channels of the wireless link;
a phase response of a third wireless channel of the plurality of wireless channels of the wireless link;
an impulse response of a fourth wireless channel of the plurality of wireless channels of the wireless link; and
one or more interface metrics extracted from one or more network interface cards associated with the system.

5. The system according to claim 1, wherein
the plurality of metrics extracted comprise at least one of:
channel state information of a first wireless channel of a plurality of wireless channels of a wireless link between the wireless transmitter and a wireless receiver where the channel state information is other than an indication of received signal strength;
a frequency response of a second wireless channel of the plurality of wireless channels of the wireless link;
a phase response of a third wireless channel of the plurality of wireless channels of the wireless link;
an impulse response of a fourth wireless channel of the plurality of wireless channels of the wireless link; and
one or more interface metrics extracted from one or more network interface cards associated with the system.

6. The system according to claim 1, wherein
the plurality of metrics extracted are extracted from at least one of a Physical (PHY) layer and a Data Link (DL) layer of an Open Systems Interconnection (OSI) model of a wireless link between the wireless transmitter and a wireless receiver;
the wireless link comprises one or more channels such that the plurality of metrics comprise for each channel at least one of information about the frequency response of the channel, information about the phase response of the channel, and an impulse response of the channel.

7. The system according to claim 1, wherein
the plurality of metrics extracted are extracted from at least one of a Physical (PHY) layer and a Data Link (DL) layer of an Open Systems Interconnection (OSI) model of a wireless link between the wireless transmitter and a wireless receiver;
the wireless link comprises one or more channels such that the plurality of metrics comprise data relating to at least one of:
a probe request at least one of from and to at least one of the wireless transmitter and the wireless receiver;
a broadcasting frame before the association of a wireless device to a further wireless device comprising one of the wireless transmitter and the wireless receiver;
a control frame at least one of after and before association of another wireless device to the further wireless device comprising one of the wireless transmitter and the wireless receiver; and
a statistic that describes variations in the wireless link between the wireless transmitter and the wireless receiver other than strength of a received signal at the wireless receiver.

8. The system according to claim 1, wherein
processing the quantized motion to establish an occupancy state of the sensing region comprises:
retrieving from a further memory accessible to the processor auxiliary information; and processing with an artificial intelligence (AI) based occupancy detection module the quantized motion and the auxiliary information to define the state of occupancy of the sensing region.

9. The system according to claim 8, wherein
the auxiliary information comprises other data contemporaneously acquired with either the plurality of metrics or the plurality of packets where the other data is one or more of:
   time-based information;
   at least one of visual information and auditory information acquired from one or more electronic devices associated with the sensing area;
   ambient sensory information acquired from one or more sensors associated with the sensing area either directly or as part of one or more other electronic devices associated with the sensing area.

10. The system according to claim 8, wherein
the AI based occupancy detection module comprises:
   a feature extraction module configured to extract features from the quantized motion for each time interval of a series of time intervals and combine these extracted features with the auxiliary information;
   a training and inference module which executes one or more memory-based machine based learning models (memory based learners) in an initial training phase and a subsequent inference phase using the combined extracted features and auxiliary information from the feature based extraction module to establish an initial label defining a state of occupancy for the sensing region within each time interval of the series of time intervals; and
   a decision-making unit which establishes a final label defining the state of occupancy.

11. The system according to claim 10, wherein
within the initial training phase the memory based learners of the training and inference module are trained using a dataset comprising:
   a series of sets of metrics acquired from a range of settings where each setting of the range of settings is another sensing region; and
   labels identifying for each set of metrics of the series of sets of metrics a state of the setting of the range of settings associated with the each set of metrics of the series of sets of metrics;
each label defines the state of the setting of the range of settings as one of subject moving, subject present but not moving and empty for one of a fixed time interval and a variable time interval; and
the AI based occupancy detection module is trained using backpropagation through time.

12. The system according to claim 8, wherein
the features extracted by the feature extraction module are higher order statistics of a time interval of the series of time intervals where each higher order statistic of the higher order statistics is a first-degree statistic or a second-degree statistic.

13. The system according to claim 8, wherein
the AI based occupancy detection module comprises:
   a feature extraction module configured to extract features from the quantized motion for each time interval of a series of time intervals and combine these extracted features with the auxiliary information;
   a training and inference module which executes one or more memory-based machine based learning models (memory based learners) in an initial training phase and a subsequent inference phase using the combined extracted features and a subset of the auxiliary information from the feature based extraction module to establish an initial label defining a state of occupancy for the sensing region within each time interval of the series of time intervals; and
   a decision-making unit which establishes a final label defining the state of occupancy in dependence upon the initial label and another subset of the auxiliary information from the feature based extraction module.

14. The system according to claim 13, wherein
within the initial training phase the memory based learners of the training and inference module are trained using a dataset comprising:
   a series of sets of metrics acquired from a range of settings where each setting of the range of settings is another sensing region; and
   labels identifying for each set of metrics of the series of sets of metrics a state of the setting of the range of settings associated with the each set of metrics of the series of sets of metrics;
each label defines the state of the setting of the range of settings as one of subject moving, subject present but not moving and empty for one of a fixed time interval and a variable time interval; and
the AI based occupancy detection module is trained using backpropagation through time.

15. The system according to claim 13, wherein
the decision-making unit employs hard coded rules which establishes a final label defining the state of occupancy in dependence upon the initial label and another subset of the auxiliary information from the feature based extraction module.

16. The system according to claim 13, wherein
the AI based occupancy detection module employs a history window comprising the quantized motion and the auxiliary information over a defined period of time prior to a current time such that in defining the state of occupancy of the sensing region the machine based learners employs information relating to previous states of the sensing region together with the quantized motion and the auxiliary information for the current time to define the current state of the sensing region.

17. The system according to claim 13, wherein
the features extracted by the feature extraction module are higher order statistics of a time interval of the series of time intervals where each higher order statistic of the higher order statistics is a first-degree statistic or a second-degree statistic.

\* \* \* \* \*